Patented June 3, 1947

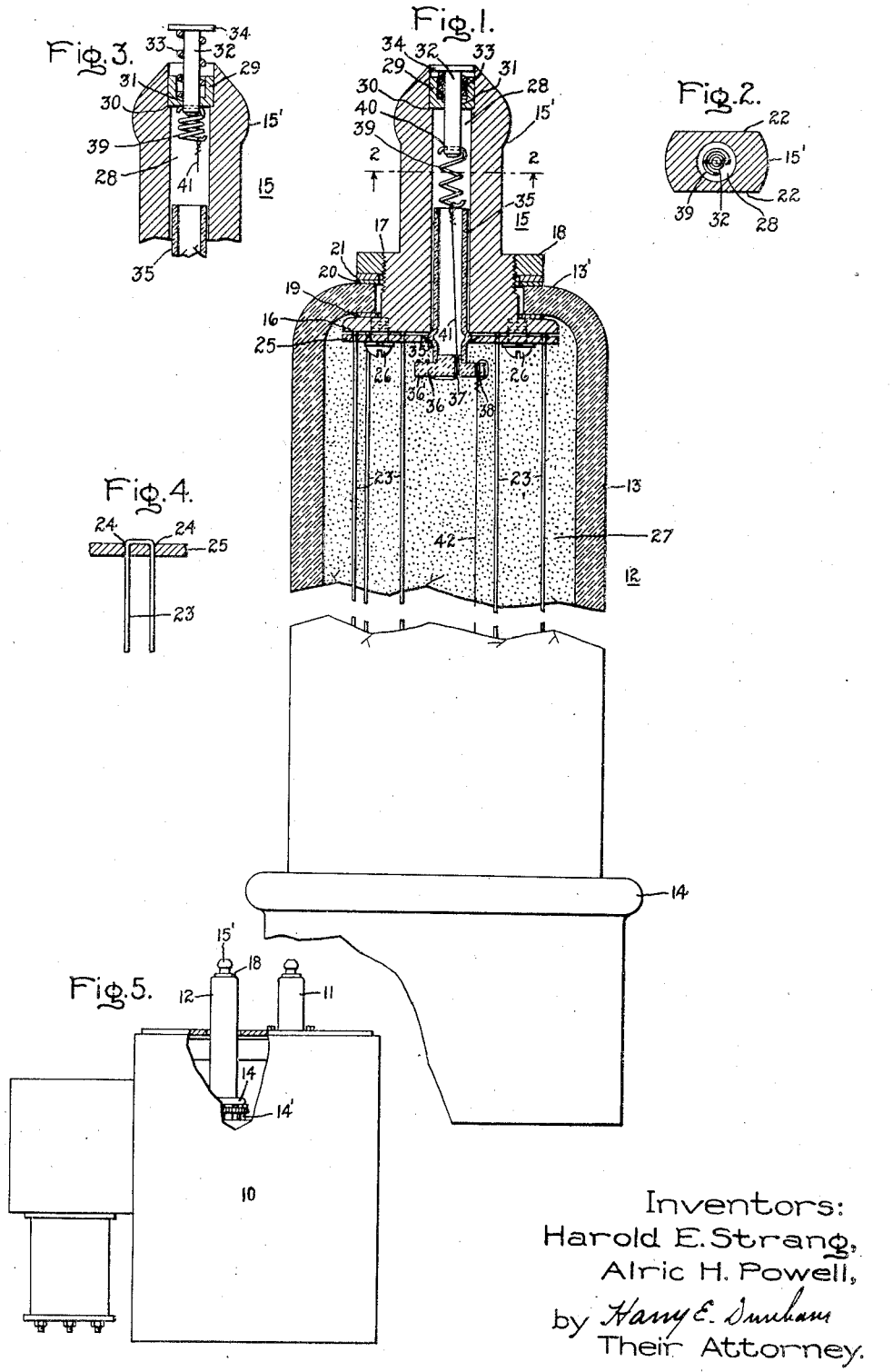

2,421,658

UNITED STATES PATENT OFFICE 2,421,658

CIRCUIT INTERRUPTING DEVICE

Harold E. Strang, Ardmore, and Alric H. Powell, Yeadon, Pa., assignors to General Electric Company, a corporation of New York Application April 28, 1943, Serial No. 484,842

6 Claims. (Cl. 200—121)

Our invention relates to circuit interrupting devices, and more particularly to a device which acts both as the conductor stud of switchgear and in itself comprises a fuse such, for example, as a fuse of the current limiting type. A conductor stud and current limiting fuse combination embodying our invention has particular application in circuit interrupting devices such, for example, as are disclosed and claimed in the copending application, Serial No. 484,832, Baskerville and Bush, filed concurrently herewith, and assigned to the same assignee as the present application.

Switchgear, of the variety commonly referred to as metal clad switchgear, generally comprises a stationary housing into which electric power circuits are connected. These power circuits are controlled by a cooperating electric circuit breaker mounted in a removable unit which may be of the vertical lift or horizontal draw-out type. When the conductor stud of vertical lift switchgear comprises a fuse of the current limiting type, for example, certain problems are encountered. In the first place the current limiting fuse must have a predetermined length commensurate with the voltage conditions involved and, secondly, when used as a conductor stud for metal clad switchgear, it must be provided with one terminal which forms the movable portion of the primary disconnecting devices capable of electrically completing the circuit to the stationary portion of the primary disconnecting devices by a simple plugging operation or by a simple linear motion. Our invention is particularly concerned with maintaining the overall length of the conductor stud which comprises a current limiting fuse at a minimum so that it may be employed in switchgear for use in standard metal clad units which are already in existence.

It will be obvious that an indicating means such as is disclosed and claimed in United States Letters Patent No. 2,188,816, Rankin, assigned to the same assignee as the present application, which has been successfully and satisfactorily used to indicate the operation of current limiting fuses, could not be satisfactorily used for current limiting fuses which form the conductor stud of circuit interrupting devices such as are disclosed and claimed in the above mentioned Baskerville and Bush application. Our invention is also concerned with a new and improved indicating means particularly applicable to current limiting fuses which are employed as the conductor studs of metal clad switchgear.

Accordingly, it is an object of our invention to provide a new and improved conductor stud for switchgear which conductor stud comprises a circuit interrupting device employing a fusible element.

It is another object of our invention to provide for switchgear, a conductor stud which includes a circuit interrupting device having a fusible element with indicating means to indicate the condition of the fusible element.

Further objects and advantages of our invention will become apparent as the following description proceeds and the features of novelty which characterize our invention will be pointed out with particularity in the claims annexed to and forming a part of this application.

For a better understanding of our invention, reference may be had to the accompanying drawing, in which Fig. 1 is a view partly in section of the conductor stud of electric switchgear embodying our invention, Fig. 2 is a sectional view taken on line 2—2 of Fig. 1, Fig. 3 is a portion of Fig. 1 to indicate a different operating condition of the device disclosed in Fig. 1, Fig. 4 is an enlarged view of a portion of the device shown in Fig. 1, and Fig. 5 is a diagram partly in section, of metal clad switchgear employing a conductor stud embodying our invention.

Referring now to the drawing, we have illustrated in Fig. 5 the removable unit for metal clad switchgear which includes an electric circuit breaker of the vertical lift type, sometimes referred to as of the drop-down type wherein disconnection of the circuit breaker from the associated circuit, is accomplished merely by bodily lowering the removable unit and the associated circuit breaker. This removable unit is generally referred to in Fig. 5 by the reference numeral 10 and includes a plurality of conductor studs 11 and 12, the number of such studs depending upon the number of phase conductors which the circuit breaker is adapted to control. In accordance with the arrangement disclosed and claimed in the above mentioned Baskerville and Bush copending application, the conductor stud 12 is essentially a current limiting fuse having a tubular insulating casing 13 of glass or other suitable material upon which is mounted a lower terminal 14 of conducting material. Lower terminal 14 is adapted to be removably connected with a flexible terminal 14' mounted in the housing of removable unit 10 so that if the fusible element of the combined conductor stud and fuse 12 is ruptured it may be replaced by a fuse and conductor stud combination in which the fusible element is intact. The lower terminal 14 is preferably mounted on casing 13 in the same manner as the terminals disclosed in the above mentioned United States Letters Patent No. 2,188,816.

The other end of tubular insulating casing 13 which is preferably formed of glass or ceramic material, is provided with a shoulder, or shelf 13' formed by partially closing that end of the casing or housing 13. This shoulder provides means by which a conducting member generally indicated at 15, which includes an elongated portion 15' in the form of a plug type contact, can be fastened thereto while maintaining the overall length of the device at a minimum. Conducting member 15 is illustrated as having an annular shoulder 16 which is adapted to engage the shoulder 13' inside tubular casing 13. Conducting member 15 is furthermore provided with a threaded portion 17 to threadedly engage a nut 18, preferably of hexagonal form, so that the shoulder 13' of casing 13 may be suitably clamped between annular member 16 and nut 18. Suitable washers such as 19, 20 and 21, may be provided adjacent the surfaces of the shoulder 13' to take care of any unevenness in the glass of insulating casing 13, for example, if it is formed of glass. Preferably washers 19 and 20 are formed of lead and washer 21 of brass or the like. The conducting member 15 is inserted into tubular casing 13 from the lower end thereof so that the elongated portion 15' extends outwardly from casing 13 and nut 18 may then be applied firmly to clamp the conducting member 15 to the shoulder 13' and consequently to seal the upper end of tubular casing 13. To facilitate this clamping operation, the elongated portion 15' of conducting member 15 which is adapted to act as a plug type contact is provided with flat sides 22, best shown in Fig. 2, whereby it may be readily held with a wrench while nut 18 is tightened to clamp conducting member 15 to shoulder 13'.

Conducting member 15 and terminal 14 form the two terminals of the fuse 12 which we have illustrated as preferably of the current limiting type. It will be understood that fuse 12 might equally well comprise some other type of fuse. In general, current limiting fuses are devices in which the current interrupting link, or agency includes a long fusible conductive section surrounded by an inert refractory granular material of high dielectric strength, the form, composition and arrangement of which material and conductive section are such that upon dissipation of the conductive section by severe short circuit current, there is, in effect, a high resistance which sharply limits the current rise and produces a rapid current decay resulting in final circuit interruption in an extremely short period of time not exceeding a half-cycle in the case of alternating current. During the circuit interrupting operation, the fusible element of the current limiting fuse dissipates throughout a section of considerable length, as distinguished from dissipation only at a point of reduced cross section. Usually a plurality of parallel wires or fusible members are provided depending upon the current rating of the fuse. The reason for using a plurality of wires is that it has been found that most effective current limiting action is produced when conductors of thin cross section are employed. Hence where the current rating demands a relatively large cross-section, it is desirable to divide this total cross section into a number of parallel conductors having a thin cross section such as a plurality of fine silver or zinc wires.

In Fig. 1 we have shown the fusible element as comprising a plurality of fine wires 23 which are preferably arranged in pairs each pair comprising a single wire returned upon itself so as to form a U as best shown in Fig. 4. The wires are suitably connected to conducting member 15 by being threaded through the openings 24 in a supporting plate 25 suitably fastened to conducting member 15 as by fastening means 26. It will be understood that the other ends of the fusible element comprising parallel wires 23 are suitably connected to lower terminal 14. The wires 23 are completely embedded in an inert granular arc extinguishing material generally indicated at 27 which completely fills casing 13. Preferably granular arc extinguishing material 27 comprises finely divided quartz, or sand.

It will be quite obvious that the indicating means disclosed and claimed in the above menationed United States Letters Patent No. 2,188,816 cannot be used satisfactorily with the combined fuse and conductor stud 12 of our invention since lower terminal 14 is substantially completely enclosed by flexible terminal 14'. Accordingly, we provide an indicating means for fuse 12 which is in some respects similar to the arrangement disclosed and claimed in United States Letters Patent 2,343,224, Powell, granted February 29, 1944, and assigned to the same assignee as the present application. When the removable unit 10 is lowered from the metal clad unit, the elongated portion 15' of conducting member 15 which forms the plug-type contact engageable with the stationary portion of the primary disconnecting devices, is immediately visible and our indicating means has therefore been associated with conducting member 15 which is provided with a passageway 28 therethrough or, in other words, is in effect, a hollow conducting member. A cup-shaped member 29 is supported on a shoulder or ledge 30 in passageway 28, the lowermost position thereof being determined by shoulder 30. Cup-shaped member 29 is provided with an opening 31 through which extends a reciprocatingly mounted indicating plunger 32 biased for upward movement by compression spring means 33. Spring means 33 is mounted in cup-shaped member 29 around plunger 32 so as to be compressed between a head 34 on plunger 32 and the bottom of cup-shaped member 29. When indicating plunger 32 is in the completely retracted position, as shown in Fig. 1, the head 34 of plunger 32 is flush with the top of the elongated portion 15' of conducting member 15.

In order to maintain plunger or indicator 32 in the non-indicating position shown in Fig. 1, it is necessary to compress spring means 33 within cup-shaped member 29. To this end I provide a tubular member 35 of insulating material such as glass, or the like, which is mounted within the passageway 28. Insulating member 35, which is provided with an enlargement 35' thereon to engage the lower edges defining passageway 28, may be supported in the position indicated in Fig. 1 in any suitable manner. The lower end of tubular housing 35 is closed by means of a suitable insulating member 36 preferably constructed of ceramic material, having a projection, or ear 36' and a plurality of openings 37 and 38 therein. A suitable tension spring 39 has one end thereof fastened to plunger 32 as indicated at 40 while the other end thereof is fastened to a strain wire 41 which in turn passes through opening 37 in ceramic member 36 and is twisted around projection or ear 36'. Tension spring 39 is stressed as shown in Fig. 1 so that plunger 32 is held in a floating condition with a substantially constant force applied to strain wire 41 whereupon jarring or rough handling of the combined fuse and conductor stud will not cause extension or rupture of strain wire 41. It will be obvious that the compression spring 33 must be a weaker spring than tension spring 39. Tension spring 39 will tend to hold tubular housing 35 in the position shown in Fig. 1.

With the floating construction of plunger 32 described above, a much weaker strain wire 41 may be used without danger of stretching or rupturing to permit the indicator or plunger 32 to move to the indicating position shown in Fig. 3. The floating type indicator described above is not our invention but is disclosed and claimed in the above mentioned Powell patent.

It is desirable to obtain operation of the indicating means including plunger 32 in response to rupture of the fusible element and to this end we provide an indicator wire 42 having the upper end thereof attached or anchored to ceramic member 36 by passing through opening 38 therein and fastened in any suitable manner as by twisting back around itself. In view of the space between the openings 37 and 38 in ceramic member 36 a suitable dielectric means equivalent to an arc gap is provided between strain wire 41 and indicator wire 42 so that normally no current flows through strain wire 41 or indicator wire 42 which are connected in parallel with the fusible element comprising fuse wires 23. Upon rupture of the fusible element comprising wires 23 due to excess current, a sufficiently high voltage is produced across the ceramic gap between strain wire 41 and indicator wire 42 to establish arcing across the gap with the consequent rupture of strain wire 41 either by melting due to current flowing therethrough or by direct burning which will cause rupture thereof even at very low currents.

The operation of the combined conductor stud and fuse described above will be obvious and no further discussion thereof will be included herein. It will be apparent that a very compact conductor stud which also is a fuse device, is provided which can be satisfactorily incorporated in a circuit interrupting device of the type disclosed and claimed in the above mentioned Baskerville and Bush application.

While we have disclosed certain specific embodiments of our invention, it should be understood that our invention is not limited to the specific details and construction thereof herein illustrated, and we intend in the appended claims to cover all such changes and modifications as fall within the true spirit and scope of our invention.

What we claim as new and desire to secure by Letters Patent of the United States is:

1. In a device adapted to be used as a conductor stud on electric switchgear through which connections with an associated electric circuit may be completed by a simple plugging operation, the combination of a tubular insulating casing having an inturned shoulder on one end thereof, a conducting member having a hollow elongated portion in the form of a plug type contact, said member having a shoulder adapted to engage the shoulder of the casing on the inside thereof, means for clamping said member to the shoulder of said casing with the elongated portion of the member extending from said casing, a terminal fastened to the other end of the casing, a fusible element interconnecting said terminal and said conducting member, and means mounted in said hollow elongated portion of said member for indicating the condition of said fusible element, said plugging operating comprising movement in the direction of the axis of said casing.

2. In a device adapted to be used as a conductor on electric switchgear through which connections with an associated electric circuit may be completed by a simple plugging operation, the combination of a hollow cylindrical insulating casing having an integral inturned annular shoulder at one end, a conducting member having a hollow elongated portion in the form of a plug type contact, said member having an annular shoulder arranged to be supported by the shoulder of said casing with the elongated portion of the member extending from said casing, means for holding said member in the supported position, a terminal fastened to the other end of said casing, a fusible element interconnecting said terminal and said conducting member, and indicating means including a floating spring biased plunger mounted in said hollow elongated portion to indicate by the position of said plunger whether or not said fusible element has operated to interrupt the circuit through said device, said plugging operation comprising movement in the direction of the axis of said casing.

3. In a device adapted to be used as a conductor stud on electric switchgear through which connections with an associated electric circuit may be completed by a simple plugging operation, the combination of a tubular insulating casing having an inturned shoulder on one end thereof, a conducting member having a hollow elongated portion in the form of a plug type contact, said member having a shoulder adapted to engage the shoulder of the casing on the inside thereof means for clamping said member to said shoulder of the casing with the elongated portion of the member extending from the casing, a terminal fastened to the other end of said casing, a fusible element interconnecting said conducting member and said terminal, and indicating means including a floating spring biased plunger mounted in said hollow elongated portion to indicate by the position of said plunger whether or not said fusible element has operated to interrupt the circuit through said device, said plugging operation comprising movement in the direction of the axis of said casing.

4. In a device adapted to be used as a conductor stud on electric switchgear through which connections with an associated electric circuit may be completed by a simple plugging operation, the combination of a tubular insulating casing having an integral inturned shoulder, a conducting member having a hollow elongated portion in the form of a plug type contact, said member having at one end a shoulder arranged to be supported by the shoulder of said casing with the elongated portion of the member extending from the casing, a terminal fastened to the other end of said casing, a fusible element interconnecting said terminal and said conducting member, and means floatingly mounted in said hollow elongated portion of said member for indicating the condition of said fusible element, said plugging operation comprising movement in the direction of the axis of said casing.

5. In combination, a tubular insulating casing provided with an inturned shoulder at one end, a conducting member having a hollow elongated portion in the form of a plug type contact and a shoulder at one end, means for supporting said member with the shoulder thereof within said casing and substantially engaging the shoulder of the casing and with the elongated portion of the member extending from the casing, a terminal fastened to the other end of said casing, a fusible element interconnecting said terminal and said conducting member, and means mounted in said hollow elongated portion of said member for indicating the condition of said fusible element, said plug type contact being adapted to engage a cooperating contact by movement of said casing in the direction of the axis thereof.

6. In combination with a tubular insulating casing having an integral inturned shoulder at one end thereof, a conducting member having a hollow elongated portion and an integral shoulder at one end, means for clamping said shoulders together with the shoulder of said member inside of said casing and the elongated portion of the member extending from the casing to form a contact, a terminal fastened to the other end of said casing, a fusible element interconnecting said terminal and said conducting member, and means mounted in said hollow elongated portion of said member for indicating the condition of said fusible element, said conducting member being adapted to engage a cooperating contact by movement of said casing in the direction of the axis thereof.

HAROLD E. STRANG.
ALRIC H. POWELL.

REFERENCES CITED

The following references are of record in the file of this patent:

UNITED STATES PATENTS

| Number | Name | Date |
|---|---|---|
| 2,306,153 | Biermanns et al. | Dec. 22, 1942 |
| 1,631,851 | Bennett | June 7, 1927 |
| 2,343,225 | Powell | Feb. 29, 1944 |
| 2,143,038 | Smith, Jr. | Jan. 10, 1939 |

FOREIGN PATENTS

| Number | Country | Date |
|---|---|---|
| 112,717 | Great Britain | Jan. 24, 1918 |
| 180,824 | Great Britain | June 8, 1922 |
| 273,370 | Great Britain | June 20, 1927 |